(12) United States Patent
Katsura et al.

(10) Patent No.: US 9,242,535 B2
(45) Date of Patent: Jan. 26, 2016

(54) ROOF APPARATUS

(71) Applicant: AISIN SEIKI KABUSHIKI KAISHA, Kariya, Aichi-ken (JP)

(72) Inventors: Shintaro Katsura, Kariya (JP); Ryuta Fukada, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/495,156

(22) Filed: Sep. 24, 2014

(65) Prior Publication Data

US 2015/0084380 A1    Mar. 26, 2015

(30) Foreign Application Priority Data

Sep. 26, 2013 (JP) ................................ 2013-199738
Sep. 26, 2013 (JP) ................................ 2013-199740

(51) Int. Cl.
  *B60J 7/043*  (2006.01)
  *B60J 7/00*   (2006.01)
  *B60J 7/22*   (2006.01)

(52) U.S. Cl.
  CPC .............. *B60J 7/0084* (2013.01); *B60J 7/0435* (2013.01); *B60J 7/22* (2013.01)

(58) Field of Classification Search
  CPC ........... B60J 7/0084; B60J 7/22; B60J 7/0435
  USPC ............... 296/213, 217, 223, 216.02–216.05, 296/220.01
  See application file for complete search history.

(56) References Cited

U.S. PATENT DOCUMENTS

| 4,678,228 A | 7/1987 | Boots |
| 6,296,302 B1 | 10/2001 | Lenkens |
| 8,506,007 B2 * | 8/2013 | Nellen et al. ................... 296/217 |
| 2004/0183341 A1 | 9/2004 | Manders et al. |

FOREIGN PATENT DOCUMENTS

| DE | 3644493 | * 6/1988 | ................. B60J 7/08 |
| DE | 43 29 583 | 10/1994 | |
| DE | 103 03 770 | 8/2004 | |
| DE | 2007021005 | * 12/2008 | ................. B60J 7/02 |
| EP | 0 187 398 | 7/1986 | |
| EP | 1 009 644 | 3/1999 | |
| JP | 4109663 | 4/2006 | |
| JP | 2011-194920 A | 10/2011 | |

* cited by examiner

*Primary Examiner* — Dennis H Pedder

(74) *Attorney, Agent, or Firm* — Finnegan, Henderson, Farabow, Garrett & Dunner LLP

(57) ABSTRACT

A roof apparatus includes a movable panel configured to open and close an opening formed at a roof of a vehicle, a pair of guide rails provided at respective edge portions of the opening in a vehicle width direction and being extended in a front-rear direction of the vehicle, a pair of support brackets provided at respective edge portions of the movable panel in the vehicle width direction and supported at the pair of guide rails to be movable and slidable relative to the guide rails, the movable panel being configured to be opened while maintaining a tilt-up state, and a wall portion provided at a front edge portion of each of the support brackets at an upper side of each of the guide rails.

7 Claims, 5 Drawing Sheets

Inside ←→ Outside
Width direction

ROOF APPARATUS

CROSS REFERENCE TO RELATED APPLICATIONS

This application is based on and claims priority under 35 U.S.C. §119 to Japanese Patent Application 2013-199738, filed on Sep. 26, 2013, and Japanese Patent Application 2013-199740, filed on Sep. 26, 2013, the entire contents of which are incorporated herein by reference.

TECHNICAL FIELD

This disclosure generally relates to a roof apparatus mounted to a vehicle such as an automobile, for example.

BACKGROUND DISCUSSION

Known roof apparatuses are disclosed, for example, in JP2011-194920A which will be hereinafter referred to as Reference 1 and in JP4109583B which will be hereinafter referred to as Reference 2. Each of the roof apparatuses disclosed in References 1 and 2 includes a movable panel that is configured to open and close an opening formed at a roof of a vehicle such as an automobile, for example. The movable panel is mounted to perform a tilt-up operation in which a rear portion of the movable panel is lifted up with reference to a front portion thereof and a slide operation in which the movable panel slides in a front-rear direction of the vehicle. The aforementioned sunroof apparatus is a so-called outer sliding sunroof so that the movable panel slides (performs the slide operation) while being maintained to be tilted-up (i.e., in a tilt-up state) during an opening and closing operation of the movable panel for opening and closing the opening.

According to the roof apparatus disclosed in Reference 1, a pair of guide rails is provided at respective edge portions of the opening to face each other in a vehicle width direction. The movable panel is configured to perform the aforementioned opening and closing operation in a state where front ends of a pair of support brackets which are attached to respective edge portions of the movable panel in the vehicle width direction are rotatably and slidably supported at the guide rails.

In addition, end portions of a deflector that is disposed at a front end portion of the opening, the end portions facing in the vehicle width direction, are rotatably supported at the guide rails. The deflector is tilted up in a state to be released from the movable panel in association with an opening operation of the movable panel so as to protrude upward relative to an upper surface of the roof in a height direction of the vehicle. That is, the deflector is brought to a deployed state. in addition, the deflector is retracted downward relative to the upper surface of the roof in the height direction of the vehicle in a state to be pressed by the movable panel in association with a closing operation of the movable panel. That is, the deflector is brought to a retracted state. The deflector is brought to the deployed state when the opening is opened to thereby inhibit air vibration caused by wind intrusion to an interior of the vehicle.

In the roof apparatus, the deflector is disposed and supported at a portion at an inner side of the guide rails in the vehicle width direction, Therefore, the deflector allows wind intrusion to portions at an outer side of the guide rails in the vehicle width direction relative to the deflector. In a fully open state of the movable panel, for example, wind intrusion to a gap formed among each of the guide rails, each of the support brackets, and the movable panel may result in wind noise.

In addition, according to the roof apparatus disclosed in Reference 2, a pair of side frames including a pair of guide rails is provided at respective edge portions of the opening to face each other in the vehicle width direction. The movable panel is configured to perform the opening and closing operation in a state where a pair of support brackets provided at respective edge portions of the movable panel in the vehicle width direction is guided and supported relative to the pair of guide rails via sliders.

In addition, front edges of the side frames are connected to each other via a front frame that extends in the vehicle width direction. Drain grooves are formed at the side frames and the front frames respectively. A front end portion of each of the guide rails protrudes in a front direction of the vehicle relative to the drain groove formed at the front frame so that the drain groove at the front frame extends by passing at a lower side of each of the guide rails to be connected to the respective drain grooves formed at the side frames. Accordingly, water flowing through the drain groove at the front frame is discharged to the outside by passing at the lower side of each of the guide rails.

In the roof apparatus disclosed in Reference 2, the guide rails are positioned at the upper side of the drain groove at the front frame. Thus, a portion of water falling from a front end portion of the movable panel may enter the guide rails to thereby cause functional members (the sliders, for example) disposed within the guide rails.

A need thus exists for a roof apparatus which is not susceptible to the drawback mentioned above.

SUMMARY

According to an aspect of this disclosure, a roof apparatus includes a movable panel configured to open and close an opening formed at a roof of a vehicle, a pair of guide rails provided at respective edge portions of the opening in a vehicle width direction and being extended in a front-rear direction of the vehicle, a pair of support brackets provided at respective edge portions of the movable panel in the vehicle width direction and supported at the pair of guide rails to be movable and slidable relative to the guide rails, the movable panel being configured to be opened while maintaining a tilt-up state, and a wall portion provided at a front edge portion of each of the support brackets at an upper side of each of the guide rails.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

An embodiment will be explained with reference to the attached drawings. In the following, a front-rear direction corresponds to a vehicle front-rear direction. in addition, a vehicle inner side and a vehicle outer side correspond to an inner side in a vehicle width direction towards a vehicle cabin and an outer side in the vehicle width direction away from the vehicle cabin respectively.

Figure 1:
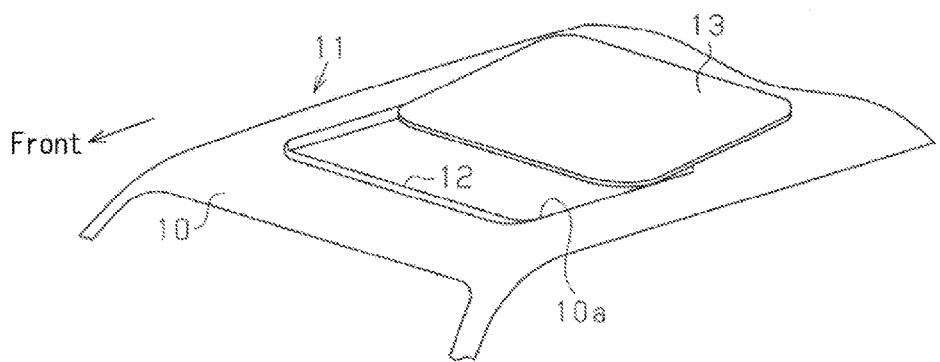
FIG. 1 is a perspective view of a roof at which a sunroof apparatus according to an embodiment is mounted and which is viewed in an obliquely upward direction.

As illustrated in FIG. 1, a substantially square or rectangular opening 10a is formed at a roof 10 of a vehicle such as an automobile, for example, and a sunroof apparatus serving as a roof apparatus is mounted at the roof 10. The sunroof apparatus 11 includes a deflector 12 disposed and supported at a front edge portion of the opening 10a while extending in the vehicle width direction. The sunroof apparatus 11 also includes a movable panel 13 substantially in a square or rectangular form made of glass plate, for example. The movable panel 13 moves in the front-rear direction for opening and closing the opening 10a.

The deflector 12 is configured to be tilted up so that a front portion of the deflector 12 moves and rotates upward with reference to a rear portion thereof. The deflector 12 is released from the movable panel 13 in association with an opening operation of the movable panel 13 and is tilted up so that the deflector 12 is brought to a deployed state in which the deflector 12 protrudes upward from an upper surface of the roof 10. In addition, the deflector 12 is pressed by the movable panel 13 in association with a closing operation of the movable panel 13 so that the deflector 12 is brought to a retracted state in which the deflector 12 is retracted downward from the upper surface of the roof 10. The deflector 12 is brought to the deployed state when the opening 10a is opened so as to inhibit air vibration caused by wind intrusion to the vehicle cabin.

The movable panel 13 is mounted at the roof 10 so as to selectively perform a tilt-up operation in which a rear portion of the movable panel 13 is lifted up or raised with reference to a front portion thereof and a slide operation in which the movable panel 13 slides in the front-rear direction. The sunroof apparatus 11 in the embodiment is a so-called outer sliding sunroof so that the movable panel 13 slides (performs the slide operation) while being maintained to be tilted-up (i.e., in a tilt-up state) during an opening and closing operation of the movable panel 13 for opening and closing the opening 10a.

Figure 2:
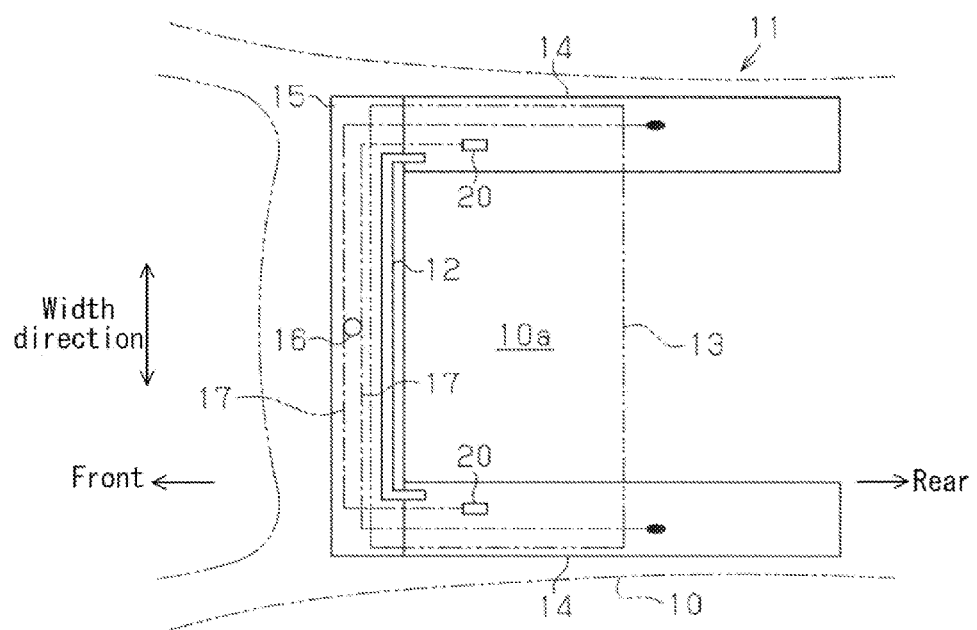
FIG. 2 is a plan view of the sunroof apparatus.

Next, a configuration of the sunroof apparatus 11 related to the opening and closing operation, for example, of the movable panel 13 will be explained. As illustrated in FIG. 2, a pair of guide rails 14 is provided at opposed edge portions of the opening 10a in the vehicle width direction. Each of the guide rails 14, which is made of aluminum alloy extruded material, for example, extends in the front-rear direction while including a constant cross section in a longitudinal direction of the guide rail 14. Respective front end portions of the guide rails 14 are connected to each other by a front housing 15 that extends in the vehicle width direction.

Opposed end portions of the deflector 12 in a longitudinal direction thereof are supported at the front end portions of the guide rails 14 so as to be positioned closer to the vehicle inner side at the guide rails 14 in a manner to be rotatable about an axis line that extends in the vehicle width direction. That is, the deflector 12 is disposed at a vehicle inner side portion between the guide rails 14. Therefore, in a fully open state of the movable panel 13, the deflector 12 interrupts intrusion of wind within a range of the vehicle inner side portion between the guide rails 14. Nevertheless, the deflector 12 is configured not to interrupt intrusion of wind to vehicle outer side portions of the respective guide rails 14 at the vehicle outer side relative to the deflector 12.

A pair of functional members 20 is supported and guided relative to the respective guide rails 14 to be movable in the front-rear direction at the vehicle outer side relative to the deflector 12. The movable panel 13 is bridged between the functional members 20 so as to be connected and supported at the functional members 20. The functional members 20 move in the front-rear direction along the guide rails 14 to thereby bring the movable panel 13 to tilt-up or slide.

An electric drive source 16 such as an electric motor including an output gear, for example, is provided at a substantially intermediate portion of the front housing 15 in a longitudinal direction thereof. The electric drive source 16 is connected to the functional members 20 via a pair of drive belts 17 made of resin material, for example, and substantially formed in a strap form so as to simultaneously move the functional members 20 in the front-rear direction.

Figure 3A:
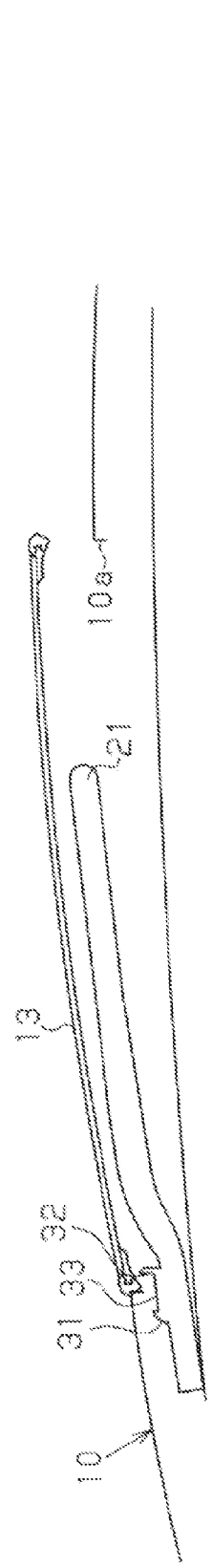
FIG. 3A is a longitudinal section view schematically illustrating a tilt-up state of a movable panel of the sunroof apparatus.
Figure 3B:
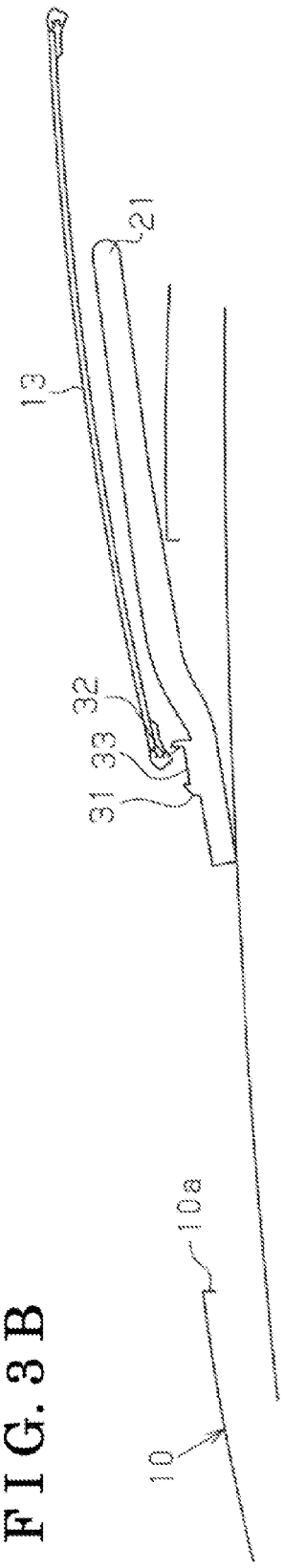
FIG. 3B is a longitudinal section view schematically illustrating a fully open state of the movable panel of the sunroof apparatus.

A pair of support brackets 21 made of metallic plate, for example, is provided at a lower portion of the movable panel 13 in a state to be disposed at opposed edge portions of the movable panel 13 in the vehicle width direction as illustrated in FIGS. 3A and 3B (in FIGS. 3A and 3B, only one of the pair of support brackets 21 is illustrated). The support brackets 21 are connected to the respective functional members 20 at the vehicle outer side relative to the deflector 12. The support brackets 21 are rotatably and slidably supported at the guide rails 14 via the functional members 20. That is, the movable panel 13 is supported by the guide rails 14 via the support brackets 21 and the functional members 20 to thereby perform the opening and closing operation by a driving force of the electric drive source 16.

Figure 5:
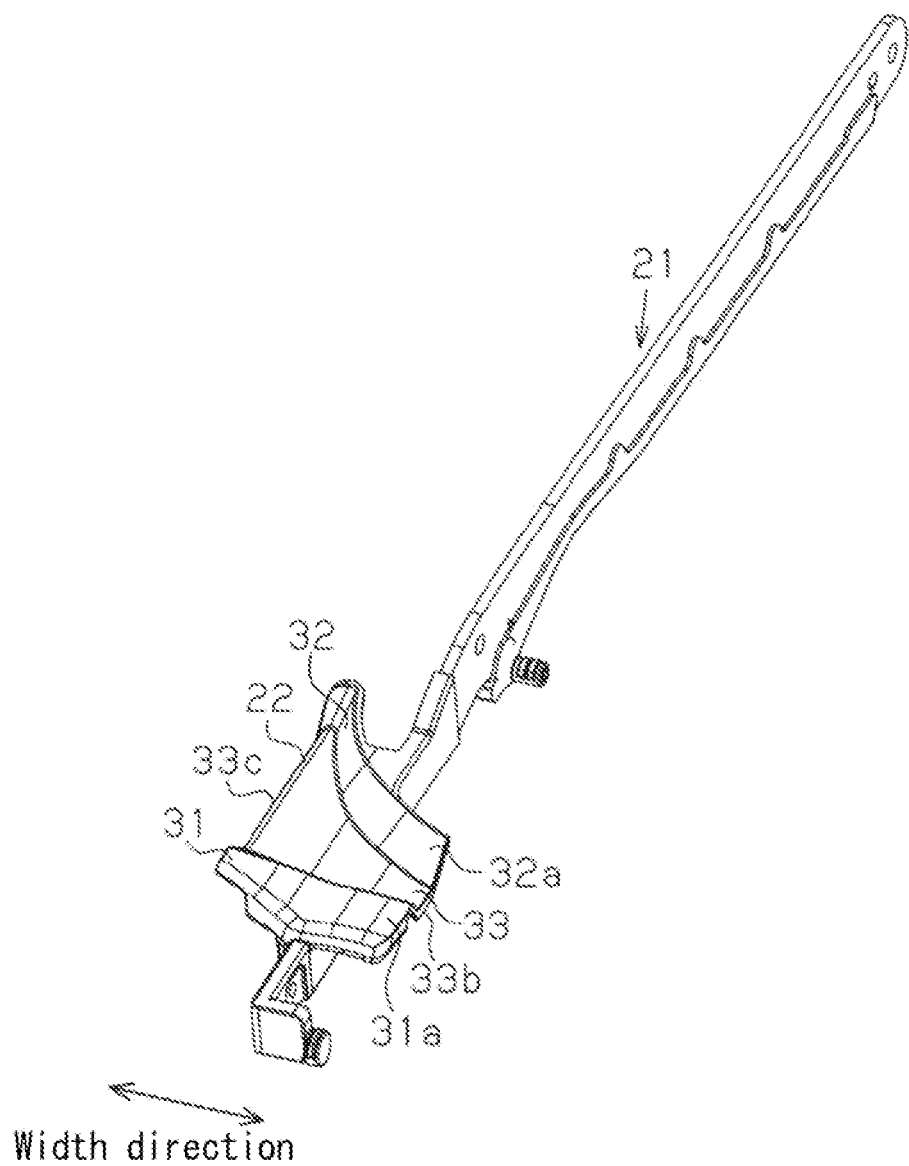
FIG. 5 is a perspective view illustrating a support bracket.

As also illustrated in FIG. 5, a cover portion 22 is integrally formed at an upper portion of a front edge of the support bracket 21 so as to protrude to the vehicle inner side and the vehicle outer side. Thus, the cover portion 22 integrally moves with the movable panel 13 in association with the opening and closing operation thereof. The cover portion 22 includes a first vertical wall 31 and a second vertical wall 32 disposed to face each other in the front-rear direction. The first vertical wall 31 serves as a wall portion and a first wall portion while the second vertical wall 32 serves as the wall portion and a second wall portion. A drain groove 33 is formed between the first vertical wall 31 and the second vertical wall 32 so as to extend (i.e., to pass through) in the vehicle width direction. That is, the first vertical wall 31 and the second vertical wall 32 inhibit water in the drain groove 33 from flowing in the front direction and the rear direction of the vehicle respectively.

Front end surfaces of the first vertical wall 31 and the second vertical wall 32 form a first inclination surface 31a and a second inclination surface 32a respectively, The first inclination surface 31a and the second inclination surface 32a are inclined upward towards the rear side of the vehicle. In addition, the first vertical wall 31 is disposed at the front side relative to a front edge portion of the movable panel 13. The second vertical wall 32 is disposed at the rear side relative to the front edge portion of the movable panel 13 and at a lower side of the movable panel 13. Accordingly, the first vertical wall 31 guides wind hitting the first vertical wall 31 to the upper rear side of the vehicle so that wind is inhibited from entering a gap formed among the guide rail 14, the support bracket 21 and the movable panel 13. The second vertical wall 32 inhibits wind from entering a gap formed among the guide rail 14, the support bracket 21 and the movable panel 13 in a vertical direction. Consequently, generation of wind noise may be further restrained.

Figure 4A:
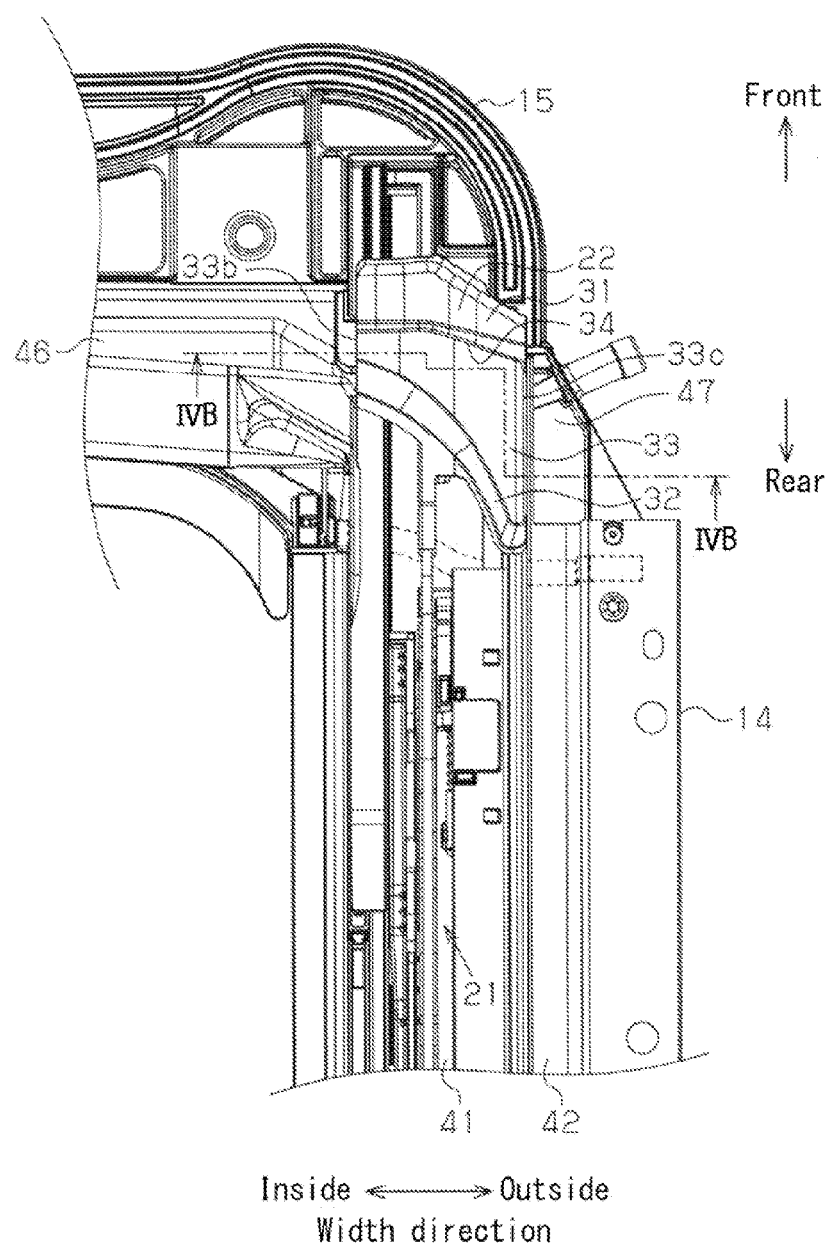
FIG. 4A is a partial plan view of the sunroof apparatus.
Figure 4B:
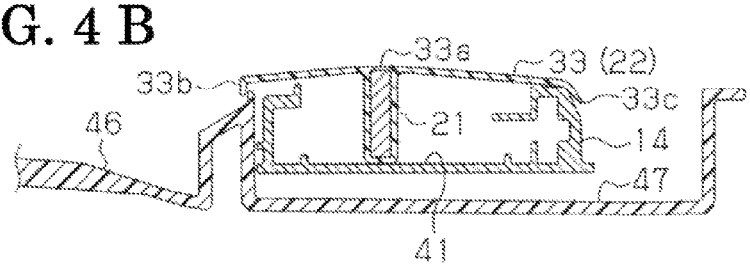
FIG. 4B is a cross-sectional view taken along line IVB-IVB in FIG. 4A.

As illustrated in FIGS. 4A and 46, a guide groove 41 that extends (i.e., passes through) in the front-rear direction and a rail drain groove 42 that is disposed adjacent to the guide groove 41 at the vehicle outer side thereof are formed at the guide rail 14. The functional member 20 is guided and supported at the guide groove 41 to be movable in the front-rear direction. The rail drain groove 42, which is disposed at the vehicle outer side relative to the support bracket 21, extends (i.e., passes through) in the front-rear direction along an edge portion of the movable panel 13 in the vehicle width direction. The drain groove 33 is formed to bridge over the guide groove 41 at an upper side thereof in the vehicle width direction.

A first housing drain groove 46 that extends (i.e., passes through) in the vehicle width direction along the front edge portion of the movable panel 13 and a second housing drain groove 47 that is disposed adjacent to the first housing drain groove 46 at the vehicle outer side thereof are formed at the front housing 15. The first housing drain groove 46 guides water falling from the front edge portion of the movable panel 13 along the vehicle width direction to be discharged to the outside. The second housing drain groove 47 includes a substantially U-shape cross section by surrounding and covering the guide rail 14 from the lower side so as to receive water flowing at the rail drain groove 42 in the front-rear direction to be discharged to the outside.

In the fully closed state of the movable panel 13, the drain groove 33 of the cover portion 22 is disposed so that end portions of the drain groove 33 at the vehicle inner side and the vehicle outer side are positioned immediately above the first housing drain groove 46 and the second housing drain groove 47 respectively. Thus, water such as rain water, for example, falling from the movable panel 13 to the cover portion 22 is guided by the drain groove 33 to the vehicle inner side to be discharged to the first housing drain groove 46 or guided to the vehicle outer side to be discharged to the second housing drain groove 47.

The drain groove 33 is formed so that portions thereof at the vehicle inner side and the vehicle outer side are inclined downward relative to a substantially center portion in the vehicle width direction. The center portion of the drain groove 33 forms a ridge line 33a linearly extending in the front-rear direction between the first vertical wall 31 and the second vertical wall 32. Accordingly, water falling to the vehicle inner side and water falling to the vehicle outer side relative to the ridge line 33a in the drain groove 33 are basically guided by the drain groove 33 in a way to be discharged to the first housing drain groove 46 and the second housing drain groove 47 respectively. That is, end portions of the drain groove 33 at the vehicle inner side and the vehicle outer side form first and second drain ports 33b and 33c of the drain groove 33 respectively.

The second vertical wall 32 that defines a rear end of the drain groove 33 is curved in an arch form by following an outline of a corner portion of the movable panel 13. On the other hand, the first vertical wall 31 that defines a front end of the drain groove 33 extends substantially linearly in the vehicle width direction. That is, the drain groove 33 is gradually expanded towards the vehicle outer side by an amount corresponding to the linear extension of the first vertical wall 31. This is because, when it is assumed that the first vertical wall 31 is curved in an arch form by following the outline of the corner portion of the movable panel 13, for example, the end portion of the drain groove 33 at the vehicle outer side is raised with reference to the end portion of the drain groove 33 at the vehicle inner side by an amount corresponding to a distance away from a rotation center of the support bracket 21 in a tilt-up state of the movable panel 13. In this case, water failing to the drain groove 33 is discharged only from the end portion of the drain groove 33 at the vehicle inner side (i.e., the first drain port 33b), which leads to deterioration of drainage. The aforementioned configuration of the first vertical wall 31 corresponds to a restraint portion 34 that inhibits water from being discharged disproportionately, i.e., in an unbalanced manner, from the first drain port 33b.

Figure 6:
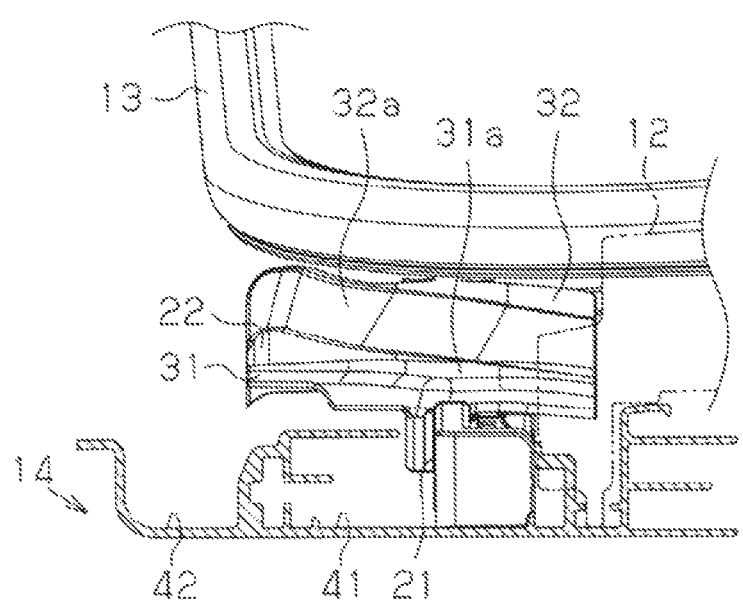
FIG. 6 is a front view of the sunroof apparatus in a fully open state of the movable panel.

Next, an operation of the embodiment will be explained. As illustrated in FIG. 6, because the first and second vertical wall portions 31 and 32 (the vertical wall portions) are provided at the front edge of the support bracket 21, a gap formed among the guide rail 14, the support bracket 21 and the movable panel 13 is filled by the first and second vertical walls 31 and 32 in the fully open state of the movable panel 13. Thus, generation of wind noise caused by intrusion of wind to the gap from the vehicle outer side relative to the deflector 12, for example, may be restrained. In addition, water falling from the front end portion of the movable panel 13 above the guide groove 41 may be guided in the vehicle width direction towards both the first housing drain groove 46 and the second housing drain groove 47 by the drain groove 33. Thus, water falling from the front end portion of the movable panel 13 may be restrained from causing the functional member 20 at each of the guide grooves 41 to be wet.

According to the embodiment, the following effects may be obtained. First, the first vertical wall 31 and the second vertical wall 32 are provided at the front end portion of the support bracket 21. Thus, in the fully open state of the movable panel 13, for example, a gap formed among the guide rail 14, the support bracket 21 and the movable panel 13 may be filled by the first vertical wall 31 and the second vertical wall 32. As a result, in a driving state of the vehicle, for example, generation of wind noise caused by intrusion of wind to the gap may be restrained.

In the fully open state of the movable panel 13, wind hitting the first and second vertical walls 31 and 32 may be guided to the upper rear side of the vehicle by the first and second inclination surfaces 31a and 32a.

In the embodiment, the drain groove 33 may be formed by using the first and second vertical walls 31 and 32. Then, water falling from the front end portion of the movable panel 13 above the guide rail 14 may be guided in the vehicle width direction by the drain groove 33.

In the embodiment, water falling from the front end portion of the movable panel 13 above the guide groove 41 is guided in the vehicle width direction towards both the first housing drain groove 46 and the second housing drain groove 47 by the drain groove 33. Thus, water falling from the front end portion of the movable panel 13 may be restrained from causing the functional member 20 in each of the guide grooves 41 to be wet. In addition, it is not necessary to provide a cover member, for example, at the front end portion of the guide rail 14 so as not to cause the functional member 20 in the guide groove 41 to be wet, which may avoid increase of the number of components.

In the embodiment, water falling from the front end portion of the movable panel 13 may be discharged from the first and second drain ports 33b and 33c, which may improve drainage. in addition, the drain groove 33 is formed so that the end portions of the drain groove 33 in the vehicle width direction (i.e., the portions of the drain groove 33 at the vehicle inner side and the vehicle outer side) are inclined downward relative to the ridge line 33a. Therefore, water failing to the respective sides in the vehicle width direction relative to the ridge line 33a may be guided to be discharged from the first and second drain ports 33b and 33c respectively.

In the embodiment, in the tilt-up state of the movable panel 13, water falling to the drain groove 33 may be restrained from disproportionately discharged (i.e. discharged in an unbalanced manner) from the first drain port 33b by the restraint portion 34.

The aforementioned embodiment may be appropriately changed or modified as follows. In the embodiment, the drain groove 33 of the cover potion 22 may be omitted. That is, instead of the first and second vertical walls 31 and 32, a continuous vertical wall may be provided. In this case, a front end surface of the vertical wall may form an inclination surface that is inclined upward towards the rear side of the vehicle in the fully open state of the movable panel 13.

In the embodiment, the front end surface of the second vertical wall 32 may form a vertical surface that extends in a vehicle height direction in the fully open state of the movable panel 13, for example. In addition, both the front end surfaces of the first and second vertical walls 31 and 32 may form vertical surfaces each of which extends in the vehicle height direction in the fully open state of the movable panel 13, for example.

In the embodiment, the restraint portion 34 may be omitted. That is, the first vertical wall 31 may be curved in an arch form by following the curve portion of the movable panel 13, for example. In addition, the ridge line 33a of the drain groove 33 may be omitted. For example, the drain groove 33 may extend substantially in parallel to the vehicle width direction.

In the embodiment, either the first drain port 33b or the second drain port 33c of the drain groove 33 may be closed. That is, water falling to the drain groove 33 may be discharged to either the vehicle inner side or the vehicle outer side, i.e., either the first housing drain groove 46 or the second housing drain groove 47.

In the embodiment, as long as the rail drain groove 42 of the guide rail 14 extends in the front direction of the vehicle up to the position of the drain groove 33, the drain groove 33 may be configured to discharge water to the rail drain groove 42 from the second drain port 33c, in this case, the drain groove 33 may be configured to discharge water to the first housing drain groove 46 from the first drain port 33b. Alternatively, in this case, the first drain port 33b may be closed so that water is inhibited from being discharged to the first housing drain groove 46.

In the embodiment, the first and second housing drain grooves 46 and 47 may be in communication with each other or be formed independently and separately.

In the embodiment, the front end surface of each of the vertical walls 31 and 32 forms each of the inclination surfaces 31a and 32a that is inclined upward towards the rear side of the vehicle in a case where the movable panel 13 is in the fully open state.

In addition, in the embodiment, the vertical wall includes the first vertical wall 31 and the second vertical wall 32 disposed to face each other in the front-rear direction, and the drain groove 33 is formed between the first vertical wall 31 and the second vertical wall 32 to be extended in the vehicle width direction.

Further, in the embodiment, the sunroof apparatus 11 includes the front housing 16 including the housing drain groove 46, 47 and being extended in the vehicle width direction to connect the front end portions of the guide rails 14. Each of the guide rails 14 includes the guide groove 41 and the rail drain groove 42, and the drain groove 33 is formed to bridge over the guide groove 41 at an upper side thereof in the vehicle width direction and is configured to guide water falling from the front end portion of the movable panel 13 in the vehicle width direction towards at least one of the rail drain groove 42 and the housing drain groove 46, 47.

Accordingly, water falling from the front end portion of the movable panel 13 above the guide groove 41 is guided in the vehicle width direction towards at least one of the rail drain groove 42 and the housing drain groove 46, 47. Thus, water falling from the front end portion of the movable panel 13 may be restrained from causing the functional member 20 in each of the guide grooves 41 to be wet.

Furthermore, in the embodiment, the drain groove 33 includes the first and second drain ports 33b and 33c at opposed end portions of the drain groove 33 in the vehicle width direction.

Furthermore, in the embodiment, the drain groove 33 is formed so that the opposed end portions of the drain groove 33 in the vehicle with direction are inclined downward relative to the ridge line 33a that is formed at a center portion in the vehicle width direction.

Furthermore, in the embodiment, the sunroof apparatus 11 includes the restraint portion 34 restraining water from being discharged in an unbalanced manner from one of the first and second drain ports 33b and 33c provided at an inner side in the vehicle width direction.

Accordingly, in the tilt-up state of the movable panel 13, water falling to the drain groove 33 may be restrained from being discharged in an unbalanced manner from one of the first and second drain ports 33b and 33c at the inner side in the vehicle width direction by the restraint portion 34.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus comprising:
a movable panel configured to open and close an opening formed at a roof of a vehicle;
a pair of guide rails, each of the pair of guide rails being provided at a respective edge portion of the opening in a vehicle width direction and being extended in a front-rear direction of the vehicle;
a pair of support brackets, each of the pair of support brackets being provided at a respective edge portion of the movable panel in the vehicle width direction and supported at a respective one of the pair of guide rails to be movable and slidable relative to the respective one of the guide rails;
the movable panel being configured to be opened while maintaining a tilt-up state; and
a cover portion provided at a front edge portion of each of the support brackets at an upper side of each of the guide rails,
wherein the cover portion includes a first wall portion and a second wall portion disposed to face each other in the front-rear direction, and wherein a cover-portion drain groove is formed between the first wall portion and the second wall portion to be extended in the vehicle width direction.

2. The roof apparatus according to claim 1, wherein a front end surface of the cover portion forms an inclination surface that is inclined upward towards a rear side of the vehicle in a case where the movable panel is in a fully open state.

3. The roof apparatus according to claim 1, further comprising a front housing including a housing drain groove and being extended in the vehicle width direction to connect front end portions of the guide rails, wherein each of the guide rails includes a guide groove and a rail drain groove, and the cover-portion drain groove is formed to bridge over the guide groove at an upper side thereof in the vehicle width direction and is configured to guide water falling from a front end portion of the movable panel in the vehicle width direction towards at least one of the rail drain groove and the housing drain groove.

4. The roof apparatus according to claim 3, wherein the cover-portion drain groove includes first and second drain lips at opposed end portions of the cover-portion drain groove in the vehicle width direction.

5. The roof apparatus according to claim 4, wherein the cover-portion drain groove is formed so that the opposed end portions of the cover-portion drain groove in the vehicle width direction are inclined downward relative to a ridge line that is formed at a center portion in the vehicle width direction.

6. The roof apparatus according to claim 4, further comprising a restraint portion restraining water from being discharged in an unbalanced manner from one of the first and second drain ports provided at an inner side in the vehicle width direction.

7. The roof apparatus according to claim 5, further comprising a restraint portion restraining water from being discharged in an unbalanced manner from one of the first and second drain ports provided at an inner side in the vehicle width direction.

* * * * *